Feb. 25, 1964  K. H. STEIGERWALD  3,122,633
APPARATUS FOR POLYMERIZATION OF LIQUID MATERIALS
Original Filed April 21, 1955  3 Sheets—Sheet 1
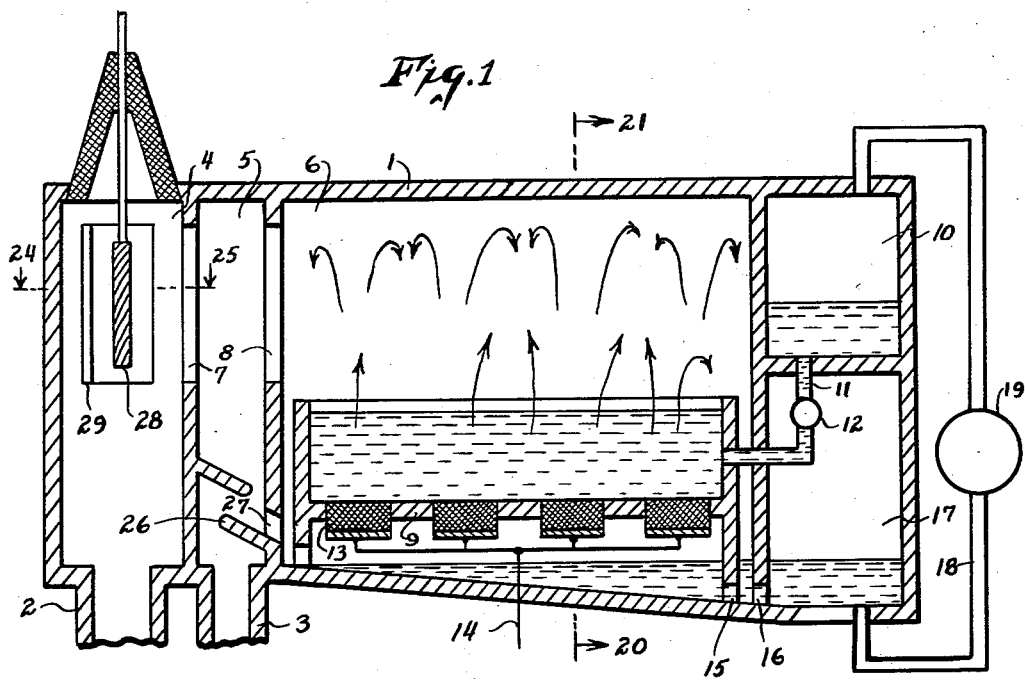
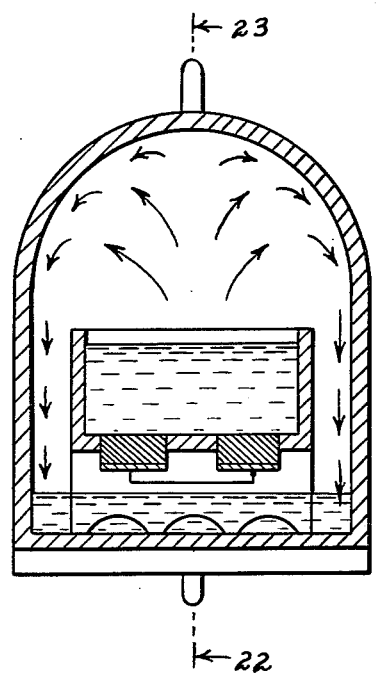
INVENTOR.
KARL HEINZ STEIGERWALD
BY
ATTORNEYS Feb. 25, 1964  K. H. STEIGERWALD  3,122,633
APPARATUS FOR POLYMERIZATION OF LIQUID MATERIALS
Original Filed April 21, 1955  3 Sheets-Sheet 2
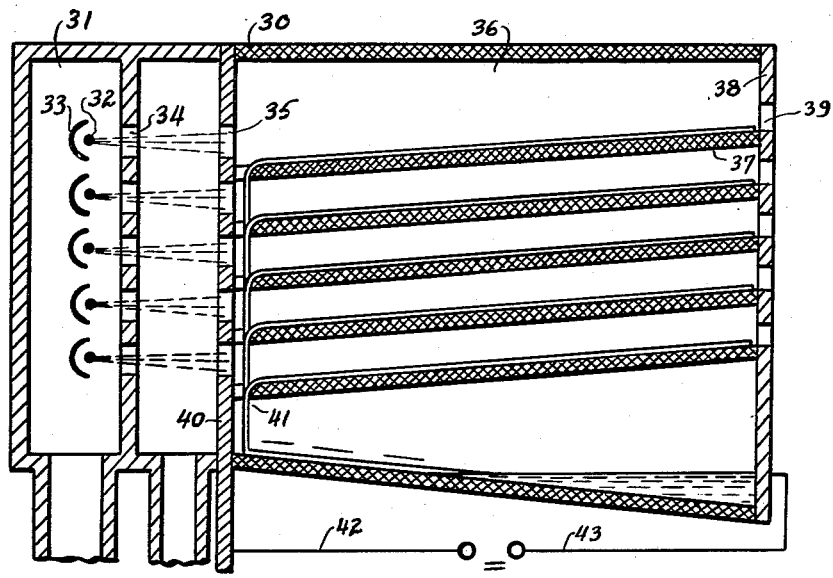
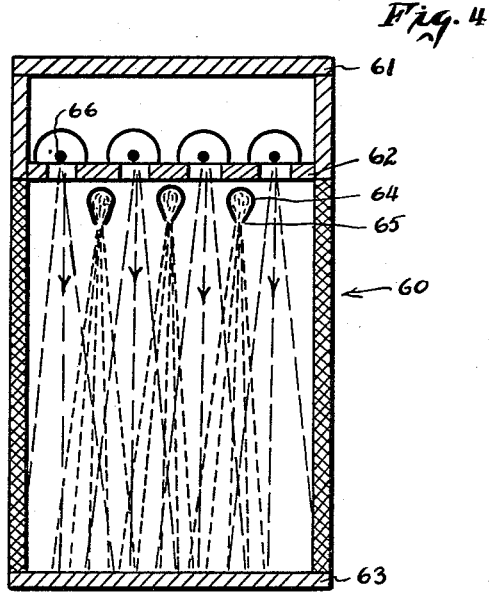
INVENTOR.
KARL HEINZ STEIGERWALD
BY
ATTORNEYS

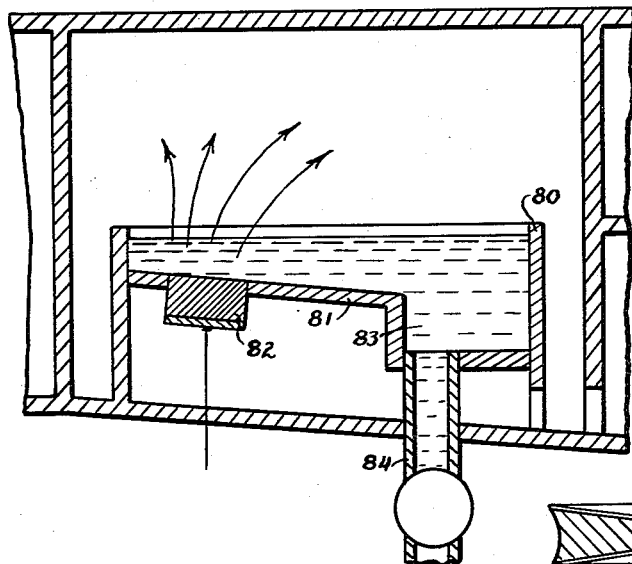
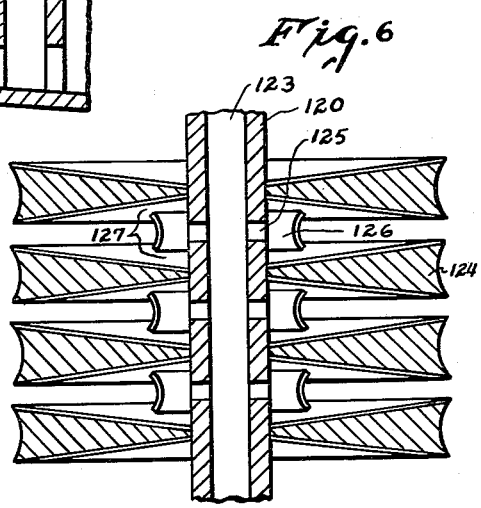
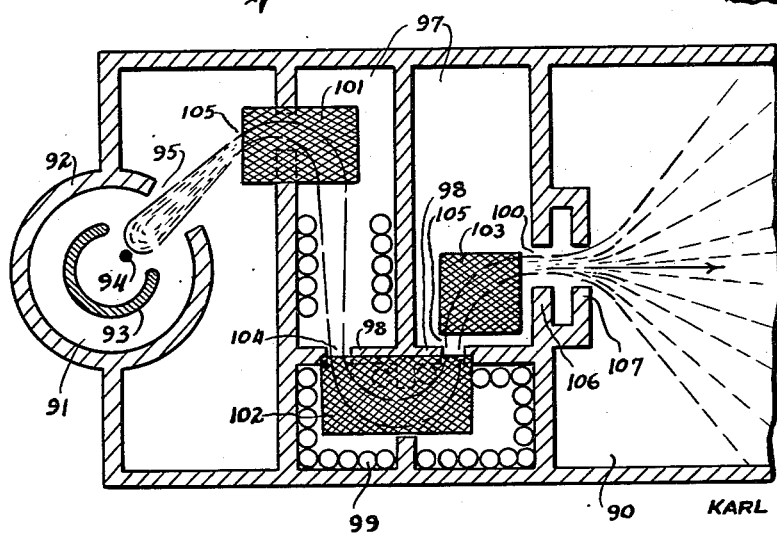

United States Patent Office 3,122,633
Patented Feb. 25, 1964

3,122,633
APPARATUS FOR POLYMERIZATION OF
LIQUID MATERIALS
Karl Heinz Steigerwald, Sauerbruch-Strasse 10,
Heidenheim, Germany
Continuation of application Ser. No. 502,939, Apr. 21,
1955. This application Dec. 14, 1959, Ser. No. 859,345
12 Claims. (Cl. 250—49.5)

This invention relates to improved apparatus for the polymerization of liquid materials and, more particularly, to apparatus for subdividing a polymerizable organic material into small volumes and irradiating the material while in the subdivided state.

This application is a continuation of my copending application Serial No. 502,939, filed April 21, 1955, now abandoned, for Method for the Forming and Processing of Plastic Masses and Parts Made of Such Masses, in which copending application a priority date of August 14, 1954, was claimed.

It is known that chemical changes take place in organic materials, especially oils and greases in liquid condition, when they are irradiated by corpuscular beams, such as a beam of electrons. Especially the hydrocarbons, which constitute the molecular framework of the substances, are partially changed in their microstructure, for example as a result of the ionizing effect of the irradiation. Hereby polymerization processes are started, which lead to the formation of solid substances within the irradiated liquids. In many cases it is possible to detect solid formations of oblong shape which grow continually if irradiation is maintained. Herein, the term "solid substances" is intended to include gelatinous substances which are not yet separated from the surrounding liquid by well-defined boundary layers.

Further it is known that the polymerization effect is dependent upon the speed of the electrons impinging upon the material. Low speed electrons may advantageously be used. However, irradiation of the mass of material by a beam of low speed electrons will effect polymerization of the surface of the material, resulting in inefficient processing.

It is therefore the object of this invention to provide an improved means for the systematic irradiation of organic liquids and to separate the polymerized material thereby to increase the effiicency of the process and to improve the economy of processing of polymerized materials for subsequent forming.

In accordance with this object, there is provided, in a preferred embodiment of this invention, means to subdivide the organic material into small volumes with high surface area and to irradiate the material while so subdivided. The liquid may be subdivided by dispersal of the material in the form of droplets or by subdividing the material in the form of a very thin film. This film can be either self-supporting or adhering to a carrier, e.g., a thin metallic net. Means are provided to concentrate the nuclei of solid substances gained through the aforesaid large-area irradiation by means of filtration, centrifugation, and sedimentation, and to submit the part of liquid which is enriched with nuclei in a proper form to a further process of irradiation. Hereby results an increase in the formation of solid substances, which is continued long enough to allow the solidification of a sufficient part of the treated liquid.

Means are also provided to orient the polymers formed by irradiation to obtain a preferential formation of fibre-like polymers.

If the treated emulsion has been sufficiently enriched with solid substances, the liquid is separated, either entirely or partly, from the solid parts by means of separation procedures which, by themselves, are already known. The extracted polymer solids can be formed into the desired end products by methods known to the art.

As mentioned above, the liquids are irradiated by a beam of charged particles, and, while irradiation with electron beams is particularly advantageous, other kinds of corpuscular radiation may be employed. Electron beams can be used for irradiation in vessels held at any desired pressure. For this purpose, the beam of slow electrons can be transferred in the manner known from the vessel, in which it is usually produced at low pressures, through vessels held at intermediate pressures and possibly through diaphragms or extremely thin films ("Lenard windows") into vessels of a higher pressure or into the open air.

The irradiation may be carried out in vessels held at pressures below atmospheric pressure, e.g., from $10^{-3}$ to $10^{-5}$ mm. Hg, at atmospheric pressure, or in vessels held at pressures higher than atmospheric pressure. It is particularly appropriate to irradiate a liquid that does not yet contain any nuclei of solid substances, in vessels of lower pressure in order to start the formation of such nuclei, whereas increasing pressures become suitable as the concentration and average size of the nuclei increase.

For economy in the polymerization of a liquid not containing any nuclei of solid substances, means are provided to mix the material with portions of liquid remaining from preceding irradiation, which naturally possess a considerable concentration of nuclei. The same purpose is served by carrying out the irradiation process in such a way as to enable the liquid to be irradiated to move in one or more cycles. To accomplish this result, means are provided to add fresh liquid in appropriate places while draining off liquid enriched with solid substances in other places.

Under certain circumstances, it can be appropriate to add chemically or otherwise different substances, e.g., inorganic powdered substances, as nuclei of solid substances.

Substances, chemically different from the irradiated substance, may therefore be added to the liquid in any desired concentration or form and to irradiate them together with it. In this manner, compounds or combinations of substances can be formed.

In many cases, it is advantageous to irradiate the polymerizable liquid, such as the slicones, at high pressures in order to effect polymerization to a significant extent. Means are provided to irradiate the liquid held in a pressurized vessel.

This invention will be more clearly understood by reference to the following description taken in conjunction with the accompanying drawings, of which:

FIGURE 1 represents a longitudinal vertical section through an apparatus assembled in accordance with the invention.

FIGURE 2 is a section through an apparatus taken along the line 2—2.

FIGURE 3 is a longitudinal section through an alternative form of irradiation apparatus.

FIGURE 4 is a section through a second alternative form of apparatus.

FIGURE 5 is a diagrammatic fragmentary section of a modified form of apparatus.

FIGURE 6 is a vertical sectional showing a modified form of the apparatus, and

FIGURE 7 is a horizontal section through a modified form of the apparatus.

FIGURE 1 shows schematically an arrangement for irradiating liquids at low pressures. 1 designates a metal vessel which can be evacuated through the two pipe lines 2 and 3. In chamber 4 a source of radiation 28 is placed, which constitutes the cathode of an electron beam source. 29 represents a focusing electrode having a negative potential relative to the cathode as usual, while the chamber walls of chamber 4, as well as the other walls of the whole vessel 1, are at ground potential and form the anode. The focused beam enters chamber 6 through openings 7 and 8 of chamber 5.

In chamber 6 a tank 9 is provided which is fed through a pipe 11 with a liquid stored in reservoir 10. Pipe 11 is furnished with a flow-regulating valve 12 which makes it possible to regulate the delivery, for instance of oil, according to the rate at which it is consumed. In the bottom of tank 9 ultrasonic generators 13 are provided which are energized by lead-wires 14 from a high-frequency generator (not shown).

By acting on the liquid, the ultrasonic vibrations separate small droplets from the surface, thus dispersing the liquid in the overlying space. This process is especially effective when working in a vacuum. While suspended in this overlying space, the droplets of the liquid are irradiated. By this means it is possible to submit a very large surface of the liquid droplets floating in the space to irradiation, the effect of which is, therefore, very intense. After a short time the droplets condense on the walls of the vessel, flowing then along these walls to the bottom of chamber 6, and are drained off through the openings 15 and 16 into the reservoir 17. Reservoirs 17 and 10 are connected by a pipe 18 in which a pump 19 is working. By this means the liquid can be carried back to the starting point and be submitted repeatedly to the irradiation.

For the purpose of better illustration, FIGURE 2 shows a section along line 20—21 of FIGURE 1. The walls of chamber 6 and chamber 5 are advantageously cooled by appropriate devices with the result of a very effective recapture and removal of the droplets and of the vapor produced from them. The cooling tempertaure should not be chosen so low as to cause the viscosity of the liquid to rise excessively and thus to prevent it from flowing sufficiently readily. Chamber 5, working on the principle of a cooled condensation chamber, has the function of a separating chamber between 6 and 4 and is at the same pressure as chambers 4 and 6. Baffles 26 and 27 are provided to prevent entry of liquid into the vacuum pump coupled to pipe 3.

It is obvious that by providing several sources of radiation, possibly of different kinds, and by choosing a suitable size, especially for chamber 6, sizable quantities of liquid can be exposed to intense irradiation in a short time. Moreover, several such layouts can be arranged in series in order continuously to treat the material. It may be advisable to impact the dispersed material by electron beams of different velocities either consecutively or simultaneously.

FIGURE 3 and FIGURE 4 show examples of arrangements for orientation of the solid components formed in the liquid with reference to the direction of irradiation.

In FIGURE 3, 30 is a vacuum vessel which consists of metal in the part shown shaded in the drawing, and of some insulating material, e.g., of ceramics, in the part marked by crosses. In chamber 31 beam sources 32 with the focusing devices 33 are placed. These sources emit beams of electrons, in a way very similar to the arrangement shown in FIGURE 1, into chamber 36 through the openings 34 and 35. In chamber 36 inclined thin plates 37 are fixed, onto which the liquid is fed through the openings 39 in the chamber wall 38, the liquid being supplied by a reservoir not shown on the drawing. The liquid flows in a flat layer along the thin plates 37 toward the openings 41 which are situated in short distance from wall 40, passing through these openings and then flowing to the bottom of chamber 36. Here a circulating installation can be provided, similar to 18 and 19 of FIGURE 1. The walls 38 and 40 are insulated from each other. While 40 is at ground potential, as in FIGURE 1, a direct current voltage is applied by means of the wires 42 and 43 between 38 and ground. In the electrical field thus created between 38 and 40, the flow of the liquid towards 40 is accelerated, and at the same time the solid parts which flow in the liquid are charged in the electric field by electrostatic induction so that they form dipoles aligned with the electrical field. By this means the irradiation is preferentially applied to the ends facing wall 40 of the oblong solid parts, while the length of these parts is exposed to an irradiation of much lower intensity.

The arrangement of FIGURE 4 in principle shows the same process, but here the liquid is dispersed by means of the electrical field and is irradiated on its way through chamber 60. The walls 61 and 62 are at ground potential, while a direct current voltage is applied between 63 and ground. 64 represents tubes with a nearly elliptic cross section which are provided in their lower part with slits 65. The liquid is supplied through these tubes. By means of the electrical field created between 63 and 62, little droplets and solid parts of substance are torn off from the sharp edges of the tubes 64. The solid parts again are aligned longitudinally in the electrical field. The irradiation is applied in the usual way from sources 66, the radiation here moving in the same direction as the liquid.

Instead of the slit tubes 64 of FIGURE 4, other dispersing devices can be used. It is also possible to develop the arrangement shown in FIGURE 4 into a rotationally symmetrical installation by rotating the diagram of FIGURE 4 about an axis situated within 61 and in the plane of drawing. An installation of this kind offers the advantage that the radiation can be produced in a comparatively small radiating device in the center of the vessel and distributed uniformly in all directions. In this manner, a particularly large quantity of liquid can be irradiated in any given time.

It is advantageous to provide means for concentrating the solid parts, arising from irradiating. A particularly advantageous arrangement is shown in FIGURE 5. Here a tank 80 is represented, which can be inserted instead of tank 9 provided for in chamber 6 of FIGURE 1. The tank has an inclined bottom 81 containing sources of ultrasonic waves 82. As the action of the ultrasonic waves consists preferentially in dispersing the liquid, the solid parts remain in the tank 80. Due to the inclined bottom and due to the vibration produced by the ultrasonic waves, the solid parts are slowly collected in the cavity 83 from where they can be removed, after a suitable concentration, through a pipe 84 which usually is closed.

Sources of ultrasonic vibrations can be used for dispersing the liquid in the irradiation vessel to a limited extent only, as the ability of being dispersed by ultrasonic vibrations is decisively limited by the viscosity of the liquid. However, springs or membranes vibrating at sonic frequencies can usefully be applied even at higher degree of viscosity. This is likewise true of rotating discs and similar devices.

In the case of considerable concentrations of solid substances, it is advantageous to use such dispersing devices as are not liable to destroy the solid formations contained in the liquid. An example of this is shown in the diagram of FIG. 6. 120 represents a rotatable hollow axis with a borehole 123. The substance to be dispersed is fed into the hollow axis. The axis is fitted with discs 124 whose thickness decreases conically with decreasing radial distance. Between the discs, the hollow axis is provided with drill holes 125 allowing the liquid to flow from the hollow axis by way of the rings 126 and slits 127 onto the surface of the discs 124. These discs are fitted with grooves extending radially outward from the axis. By the centrifugal force, the liquid is caused rapidly to flow toward the rims 121 where it is thrown off the discs and thereby dispersed. The neighboring conical surfaces of two consecutive discs 124, when prolonged outwards, intersect at an angle determined by the conical surfaces, which in its turn determines the region into which the dispersed substances are carried. In this manner, the entire space surrounding the axis is substantially uniformly filled with dispersed substances. In a somewhat different application of this device, the rings 126 and the discs 124 may alone rotate while the axis 123 is not rotated.

As another alternative to the dispersal through ultrasonic vibrations wire nets, in the form of discs can be partly immersed in the liquid, and rotate to carry the adhering quantity of liquid upwards and expose it to irradiation.

In the case of a liquid being irradiated in dispersed condition, there is the danger that small droplets or vapors of the substance diffuse from the irradiation vessel into the vessel that contains the electron beam. This is particularly true of arrangements in which an appreciable pressure difference exists between the irradiation and discharge chambers. The diagram of FIG. 7 shows an arrangement which permits the liquid to be dropped when the irradiating beam is a beam of electrons. 90 represents the irradiation chamber which contains the liquid in highly dispersed condition. The electron beam source is situated at the discharge vessel 91 whose walls 92 are held at earth potential and act as the anode. The beam-producing system is of the triode type electron beam source of FIG. 1, and FIG. 7 shows the cross section along lines 24—25 of FIG. 1. 93 is a negative focusing electrode; 94 represents an incandescent filament. The anode chamber 92 is fitted with a slit 95 through which the band-shaped electron beam 96 enters the labyrinthic chamber 97. The chamber walls are fitted with metallic trapping sheets and can be cooled, e.g., by pipes 99. The chamber 97 is connected with the irradiation chamber 90 by means of the opening 100. In the areas 101, 102, and 103 within 97, magnetic fields are provided with their lines of force essentially extending perpendicularly of the plane of drawing. The magnetic field existing in the area 101 has the opposite polarity of the field in the area 102. In this manner it is possible to deflect the electron beam traversing the magnetic fields on approximately circular paths, by 180° from its original direction. If the magnetic field strengths are appropriately chosen, the electron beam will thus travel along paths determined by the internal walls of chamber 97. By an appropriate choice of the strengths and dimensions of the magnetic fields it is possible to utilize the focusing action exerted on the electron beam by the magnetic fields in the manner of cylindrical lenses. Thus, the focus at 105 formed by the electron beam source is imaged at 104 by the magnetic field 101; the focus at 104 in its turn is imaged by 102 in the opening 105, and a further image is formed at 100 by the focusing action of 103.

In this manner, a strict guiding of the electron beam on its path through chamber 97 is achieved. In the opening 100, an additional magnetic field is created between the pole pieces 106 and 107, its lines of force essentially being parallel to the plane of drawing. This field forms a magnetic cylindrical lens refracting the electron beam in such a way as to spread it diffusely before it enters the chamber 90. In this manner it can be achieved that the electron radiation is spread through almost the entire volume of 90.

The arrangement shown in FIG. 7 can likewise be adapted to the case of a higher pressure being maintained in the chamber 90 than in the discharge vessel 91. In that case, intermediate pressures are maintained in the chambers situated between 90 and 91, the openings at 101, 104, 98 and 100 serving as diaphragms which determine the pressure difference between adjoining chambers. In the manner known, the chambers are connected, by means of pump leads not shown in the diagram, to pumps maintaining the pressure differences. The focusing action of the magnetic fields offers particularly favorable conditions for dimensioning the diaphragms. Besides the sources of corpuscular beams hitherto mentioned other known sources of corpuscular radiations may be used. Particularly, radioactive substances available as by-products of nuclear reactors may be used as sources of radiation. It is likewise possible to mix these substances with additional substances with a view to causing the emission of secondary radiations, or to mix them with the substances to be irradiated in such a way that a separation of the substances can be carried out after the irradiation has been effective to a sufficient extent. Furthermore, it is possible to utilize radiations existing in nuclear reactors or similar installations by conveying substances to be treated through suitable parts of such installations.

As soon as the solid substance is separated, either partially or entirely, from the liquid, it can be further treated, ccording to its chemical and mechanical qualities. Possibly a further chemical treatment is necessary. Likewise, thermal and mechanical operations can be inserted such as, for example, kneading at certain temperatures.

For the production of fibres it can be advantageous to treat further the solid, fibre-like parts obtained. They can be centrifuged and loosened, and their surface can be shrunk and/or fixed by chemical treatment. Then the material can be worked up a similar way as in the regular spinning operation of cotton or similar substances.

The invention may be variously modified and embodied with the scope of the subjoined claims.

What is claimed is:

1. In combination, a container, means for introducing a quantity of a polymerizable liquid into said container, means within said container for mechanically dividing said liquid into smaller volumes having a high surface area for each of said volumes, a source of low energy electrons, said source being directly coupled to said container in electron transfer relationship to irradiate said smaller volumes by the electrons passing into said container from said source, and means for removing the polymerized material formed by irradiation of said liquid.

2. A combination in accordance with claim 1 in which said dividing means comprises inclined plates, means to flow said liquid in thin sheets on said plates, said plates being inclined to expose the entire surface of the material to electron impingement from said source.

3. A combination in accordance with claim 1 which includes means for concentrating the polymerized material and to removing said concentrated material from said container.

4. A combination in accordance with claim 1 which includes a labyrinth chamber between said source and said container, said chamber having a first opening communicating with said container and a second opening communicating with said source, said openings being displaced axially, and means for directing said electrons through said openings in said chamber.

5. A combination in accordance with claim 1 which includes means for evacuating said container.

6. A combination in accordance with claim 1 which includes a first chamber enclosing said source, a second chamber between said source and said container, said chamber having openings to permit electron passage from said source to said container, means for evacuating said first chamber, and means for evacuating said second chamber.

7. In combination a source of low energy electrons, a first chamber enclosing said source, a second chamber having openings to permit electron passage from said source, a second chamber having openings to permit electron passage from said source through said second chamber, a container contiguous to said second chamber, said container having openings to permit the electrons passing through said second chamber to enter said container, means for introducing a quantity of a polymerizable liquid into said container, means within said container for mechanically dividing said liquid into smaller volumes having a high surface area for each of said volumes, each of said smaller volumes being exposed to irradiation by said electrons entering said chamber for polymerization of said material, means for removing the polymerized material formed by irradiation of said liquid, and means for evacuating said first and second chambers.

8. A combination in accordance with claim 1 which includes means for generating an electrostatic field across said liquid to align the molecules thereof in a preferred direction during irradiation.

9. A combination in accordance with claim 1 in which said dividing means comprises an ultrasonic source to disperse the material in droplets exposed to said electrons.

10. A combination in accordance with claim 1 in which said dividing means comprises a plurality of pipes having apertures, and means for filling said pipes with said material, said pipes located at high voltage potential to accelerate monomers passing through said apertures and to disperse said material in droplets, said droplets exposed to electron impingement.

11. A combination in accordance with claim 1 which includes annular discs rotatably mounted in said container and means for flowing said liquid onto said discs.

12. A combination in accordance with claim 1 which includes a reservoir, and walls enclosing said container and reservoir, said walls being cooled to condense dispersal material and to provide a path for material flow into said reservoir.

References Cited in the file of this patent

UNITED STATES PATENTS

| | | |
|---|---|---|
| 1,883,799 | Kipper | Oct. 18, 1932 |
| 1,961,493 | Hillis | June 5, 1934 |
| 2,989,633 | Wilson | June 20, 1961 |